US008626375B2

(12) United States Patent
Miller et al.

(10) Patent No.: US 8,626,375 B2
(45) Date of Patent: Jan. 7, 2014

(54) MULTIPLEXING DEVICE WITH PROVISION FOR EXPANSION

(75) Inventors: Garret Miller, Owatonna, MN (US); Eric Vande Zande, Owatonna, MN (US); Adam Gentner, Huntington Beach, CA (US); Ray de Schepper, Norwalk, CA (US); William W. Wittliff, III, Gobles, MI (US)

(73) Assignee: Bosch Automotive Service Solutions LLC, Warren, MI (US)

(*) Notice: Subject to any disclaimer, the term of this patent is extended or adjusted under 35 U.S.C. 154(b) by 278 days.

(21) Appl. No.: 13/040,705

(22) Filed: Mar. 4, 2011

(65) Prior Publication Data

US 2012/0226408 A1    Sep. 6, 2012

(51) Int. Cl.
*G01M 17/00* (2006.01)
*G06F 7/00* (2006.01)
*G06F 19/00* (2011.01)
*G06F 11/30* (2006.01)
*G07C 5/00* (2006.01)

(52) U.S. Cl.
USPC ........ 701/29.1; 701/29.6; 701/32.8; 361/827; 361/828

(58) Field of Classification Search
USPC .............. 701/36, 29.1, 29.6, 31.4, 31.5, 32.7, 701/32.8, 33.2, 34.2, 34.3, 34.4; 702/183, 702/184, 185; 361/826, 827, 828
See application file for complete search history.

(56) References Cited

U.S. PATENT DOCUMENTS

| | | | |
|---|---|---|---|
| 5,214,582 A * | 5/1993 | Gray .............................. 701/36 |
| 5,325,422 A | 6/1994 | Ladd | |
| 5,442,170 A * | 8/1995 | Kreft et al. .................... 250/229 |
| 5,447,606 A | 9/1995 | Pruitt | |
| 5,491,418 A | 2/1996 | Alfaro et al. | |
| 5,491,746 A | 2/1996 | Pinard | |
| 5,517,556 A | 5/1996 | Pounds et al. | |
| 5,555,498 A | 9/1996 | Berra et al. | |
| 5,557,659 A | 9/1996 | Hyde-Thomson | |
| 5,683,261 A * | 11/1997 | Ahles et al. ................... 439/189 |
| 5,737,711 A | 4/1998 | Abe | |
| 5,832,463 A | 11/1998 | Funk | |
| 5,850,520 A | 12/1998 | Griebenow et al. | |
| 5,884,202 A | 3/1999 | Arjomand | |
| 5,987,974 A | 11/1999 | Lewis et al. | |
| 6,131,116 A | 10/2000 | Riggins et al. | |
| 6,236,917 B1 | 5/2001 | Liebl et al. | |
| 6,282,469 B1 | 8/2001 | Rogers et al. | |
| 6,377,950 B1 | 4/2002 | Peters et al. | |
| 6,407,554 B1 * | 6/2002 | Godau et al. .................. 324/503 |
| 6,526,340 B1 | 2/2003 | Reul et al. | |
| 6,701,233 B2 | 3/2004 | Namaky et al. | |
| 6,709,275 B1 * | 3/2004 | Ihde ................................ 439/35 |
| 6,816,760 B1 | 11/2004 | Namaky | |

(Continued)

*Primary Examiner* — Rami Khatib (74) *Attorney, Agent, or Firm* — Baker & Hostetler LLP (57) ABSTRACT

An apparatus and method are provided that allow a diagnostic tool to communicate with a data link connector in a vehicle and place the vehicle in a desired state for diagnostic testing. A cable that can automatically multiplex its connections in order to make the appropriate connections between the diagnostic tool and the data link connector based on a communication protocol of the vehicle under test. A connector allowing for selective switching of pins of the connector to jump connect the selected pins. This allows the vehicle to be placed in the proper state for diagnostic testing and the diagnostic tool to communicate with the data link connector regardless of the pins being used by the communication protocol of the vehicle.

20 Claims, 8 Drawing Sheets

(56) References Cited

U.S. PATENT DOCUMENTS

| | | |
|---|---|---|
| 6,874,680 B1 | 4/2005 | Klaus et al. |
| 6,928,349 B1 | 8/2005 | Namaky et al. |
| 7,105,741 B2 | 9/2006 | Banar et al. |
| 7,248,954 B2 | 7/2007 | Chinnadurai et al. |
| 7,305,289 B2 | 12/2007 | Gessner et al. |
| 7,473,851 B2 * | 1/2009 | Dunand et al. ............... 174/254 |
| 7,778,749 B2 * | 8/2010 | McGee et al. ............... 701/33.2 |
| 7,805,228 B2 | 9/2010 | Liebl et al. |
| 7,885,739 B2 | 2/2011 | Chinnadurai et al. |
| 2005/0182535 A1 * | 8/2005 | Huang .............................. 701/29 |
| 2006/0041349 A1 | 2/2006 | Chinnadurai et al. |
| 2006/0101311 A1 | 5/2006 | Lipscomb et al. |
| 2006/0217855 A1 * | 9/2006 | Chinnadurai et al. .......... 701/29 |
| 2008/0103653 A1 * | 5/2008 | Raichle et al. ................. 701/29 |
| 2010/0217479 A1 * | 8/2010 | Dahl et al. ...................... 701/33 |
| 2010/0256865 A1 * | 10/2010 | Ying .............................. 701/33 |

\* cited by examiner

MULTIPLEXING DEVICE WITH PROVISION FOR EXPANSION

FIELD OF THE INVENTION

The present invention relates generally to a diagnostic cable. More particularly, the present invention relates to a multiplexing diagnostic cable for use with a vehicle diagnostic tool.

BACKGROUND OF THE INVENTION

Modern vehicles typically have one or more diagnostic systems, generally having separate computer control modules or electronic control units (ECUs) to control various functions of the vehicle. Some examples include powertrain control module (PCM), engine control module (ECM), transmission control module (TCM), and anti-locking brake system (ABS). The vehicle diagnostic systems often have self-diagnostic capability to detect and alert the driver of problems the vehicle may be encountering. When a problem is found, a diagnostic trouble code or DTC, is set within the computer's memory. DTCs are as general or as specific as the manufacturer desires.

To retrieve and decipher DTCs, an auto repair technician needs a diagnostic tool. The diagnostic tool must, therefore, be connected to the vehicle's data link connector (DLC) to access and retrieve the DTCs. Diagnostic tools are testing devices that interface with the vehicle's diagnostic systems to retrieve information from the various control modules. The diagnostic tools are equipped to communicate in various communication protocols such as Controlled Area Network (CAN), J1850 VPM and PWM, ISO 9141, Keyword 2000 and others. These communications protocols are specific to the various automobile manufacturers.

A cable is used to interface the diagnostic tool with the DLC. Although the DLC typically is a J1960 type connector having 16 pins for various communications, controls and measurements, the use of the different pins for different functions varies between the different modules in the vehicle and can also vary with different manufactures of the vehicles. Thus, a maintenance garage would need to carry different cables configured for the various pin configurations and communication protocols used by various vehicle manufacturers. Additionally, the garages can carry different "keys" or smart system interface (SSI) that can be individually configured for a certain vehicle or communication protocol. These solutions are problematic in that they require the garage to carry various cables or keys for the various vehicles being serviced and require the technician to know which cable or key goes with which vehicle under service. Additionally, the cables and keys can get lost because there are so many to keep track of in the garage.

The J1962 connector also supplies the ground signal to the diagnostic tool so that the diagnostic tool can use that as a reference signal. Without a good ground signal, the measurements received by the diagnostic tool may not be accurate. The ground signal can be from a chassis ground or from a signal ground. However, some vehicles do not supply both so that receiving a reference signal can be difficult.

In order to conduct certain tests in a vehicle certain pins must be grounded. This requires a shop to purchase many jumper connectors, each having different pins to ground the various pins on the DLC, to conduct the desired tests.

Accordingly, it is desirable to provide an adaptive cable that is configurable between a diagnostic tool and a DLC. It is also desirable to provide an adaptive cable that can control and multiplex with a jumper connector to jump the desired pins so that one connector can be utilized.

SUMMARY OF THE INVENTION

The foregoing needs are met, to a great extent, by the present invention, wherein in one aspect an apparatus is provided that in some embodiments can provide automatic multiplexing capabilities to a cable that connects a diagnostic tool to a DLC of a vehicle. Additionally the cable can also connect to a jumper connector that connects to a vehicle.

In accordance with one embodiment of the invention, an adaptive cable for use with a vehicle diagnostic tool is provided, which can comprise a complex programmable logic device adapted to receive instructions from the vehicle diagnostic tool, a multiplexer adapted to receive instructions from the complex programmable logic device to configure the multiplexer connections for a vehicle communication protocol and for a jump connection of cable pins, a first cable to connect the adaptive cable to the vehicle diagnostic tool at a first end and to communicate with the complex programmable logic device at a second end, a second cable to connect to a data link connector in a vehicle at a first end, the first end having the cable pins for the jump connection, and to communicate with the multiplexer at a second end, a housing that houses the multiplexer, a portion of the first cable, a portion of the second cable, and the complex programmable logic device, and a plurality of switches on a surface of the first end of the second cable, the each of the plurality of switches paired to the corresponding cable pin.

In accordance with another embodiment of the invention, an adaptive cable for use with a vehicle diagnostic tool is provided, which can comprise a means for controlling that receives instructions from the vehicle diagnostic tool, a means for multiplexing that receives instructions from the means for controlling to configure the means for multiplexing connections for a vehicle communication protocol and for a jump connection of cable pins, a first means for transmitting that connects the adaptive cable to the vehicle diagnostic tool at a first end and to communicate with the means for controlling at a second end, a second means for transmitting that connects to a data link connector in a vehicle at a first end, the first end having the cable pins for the jump connection, and to communicate with the means for multiplexing at a second end, a means for housing the means for multiplexing, a portion of the first means for transmitting, a portion of the second means for transmitting, and the means for controlling, and a plurality of means for switching on a surface of the first end of the second means for transmitting, each of the plurality of means for switching paired to the corresponding cable pin.

In accordance with yet another embodiment of the invention, a method of placing a vehicle in a desired state for diagnostic testing which can comprise the steps of receiving a communication protocol instruction from a diagnostic tool via a first cable of an adaptive device having a complex programmable logic device and a multiplexer, sending configuration instructions from the complex programmable logic device to the multiplexer, wherein the multiplexer configures its connections based on the communication protocol instructions, providing communication between the diagnostic tool and a data link connector with a communication protocol module, and the multiplexer via a second cable connected to the data link connector, and shorting connector pins on the data link connector of the vehicle to place the vehicle in the desired state.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The invention will now be described with reference to the drawing figures, in which like reference numerals refer to like parts throughout. An embodiment in accordance with the present invention provides an adaptive cable connected to a jumper connector and method that allow a diagnostic tool to communicate with a DLC of a vehicle and jump pin connections to initiate certain tests.

Figure 1:
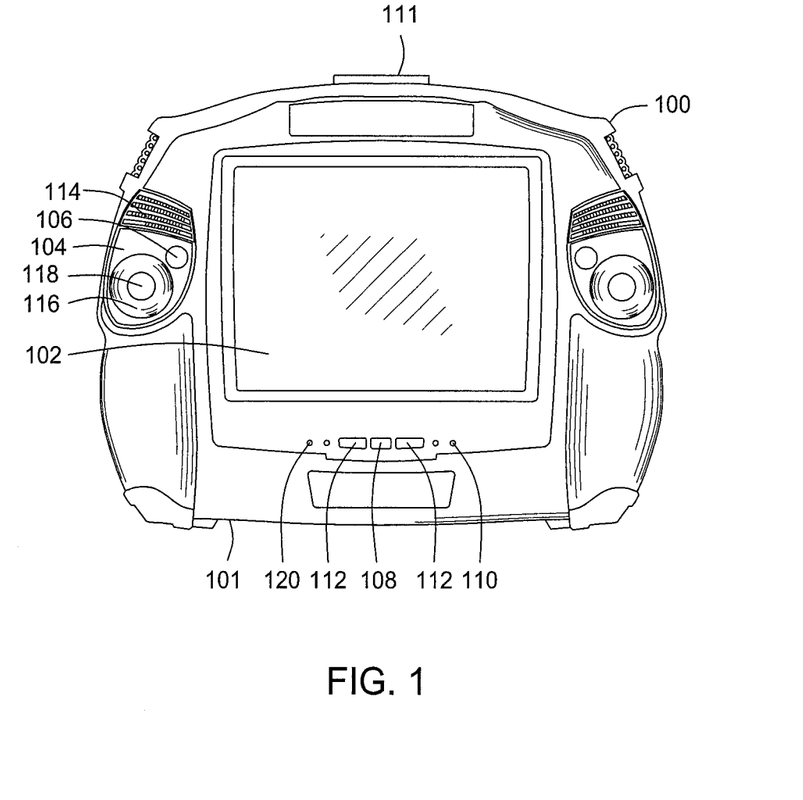
FIG. 1 is a front view of a diagnostic tool that can be connected to the adaptive cable according to one embodiment of the invention.

FIG. 1 illustrates a front view of a diagnostic tool 100 according to an embodiment of the invention. An example of the diagnostic tool is the Pegisys® from Service Solutions (Owatonna, Minn.), business unit of a SPX Corporation. The diagnostic tool 100 includes a housing 101, display 102, a scroll device (or input device) 104, a power button 108, LED indicators 110, a connector interface 111, and function buttons 112. The display can be any type of display including LCD, LED, VGA, OLED, SVGA and other types of displays including touch screen displays. The display may be a colored, non-colored (e.g. gray scale) or a combination of both. The display can display information such as the make, model, year of vehicles that the diagnostic tool can diagnose, the various diagnostic tests the diagnostic tool can run, diagnostic data the diagnostic tool has received, the baseline data of the various components in a vehicle, part images, parts information, and information from remote servers (internet, database information, etc). Additionally, the display can show videos for the user to view and the accompanying audio can be heard via the built in speakers 114. The speakers can be a single speaker or multiple speakers (as shown) for stereo sound. In one embodiment, the display allows the user to input selection through the touch screen for interactive navigation and selection, wherein the technician can select a menu item by touching the selection on the screen.

The scroll device 104 can be used to scroll through information or menus on the display, such as vehicle information or available diagnostic tests and used to input information. In one embodiment, there is one scroll device 104 and in another embodiment there are two or more scroll devices 104. When two scroll devices 104 are present, the user can have dual controls of the menus or the selections on the display. By having two scroll devices, it will be easier for a technician to use the diagnostic tool regardless if he was left-handed or right-handed. The scroll device includes an "enter" button 118 so that user can select the menu item, for example, a vehicle make, the part information, or a diagnostic test to run. The scroll device 104 also includes a scroll wheel 116 that can rotate around the "enter" button 118. The scroll wheel 116 also includes up, down, left and right arrow controls. The scroll wheel 116 allows the technician to move an indicator on the screen so that the information, such as menus can be scrolled and a selection on the screen can be made. The scroll wheel 116 is configured for a fast response or fast scrolling. The scroll device 104 also includes a scroll button 106, such as an "esc" (escape) button or any other button desired by the technician, such as a "back" or "forward" button. The scroll button 106 including any components of the scroll device 104 can be programmed for any desired functionality.

The face of the diagnostic tool 100 includes the power button 108 that allows the technician to power "ON" and "OFF" the diagnostic tool 100. The power button 108 can also be used to put the tool 100 into a standby mode in order to save battery power when not in use. Also on the face of the diagnostic tool are LEDs to indicate various status of the functionality of the diagnostic tools, such as wireless connectivity or network connectivity, low battery and any other indicators desired by the technician. The face of the diagnostic tool further includes function buttons 112 that when pressed allows a user to perform a specified function such as controlling the brightness of the display, volume of the speakers or any other function desired by the technician. A microphone 120 allows the technician to record information such as the noise being made by the vehicle for later analysis or for comparison with stored data. Further, the technician can also record comments or notes during the testing for later retrieval and analysis.

Figure 2:
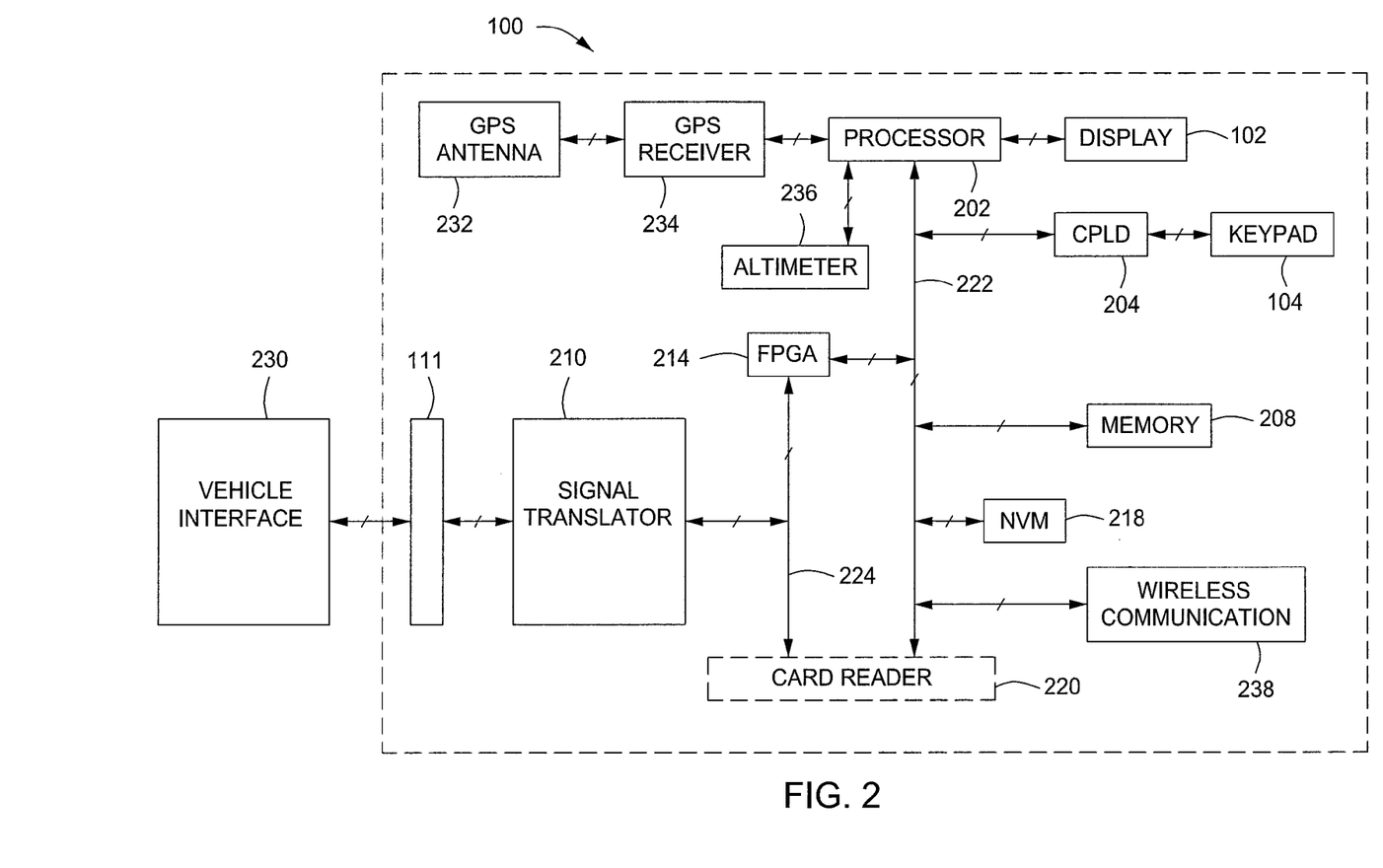
FIG. 2 is a block diagram of the components of the diagnostic tool of FIG. 1.

FIG. 2 is a block diagram of the components of the diagnostic tool 100. In FIG. 2, the diagnostic tool 100 according to an embodiment of the invention includes a processor 202, a field programmable gate array (FPGA) 214, a first system bus 224, the display 102, a complex programmable logic device (CPLD) 204, the input device in the form of a keypad (scroll device) 104, a memory subsystem 208, an internal non-volatile memory (NVM) 218, a card reader 220 (optional), a second system bus 222, a connector interface 111, a selectable signal translator 210, a GPS antenna 232, a GPS receiver 234, an optional altimeter 236 and wireless communication circuit 238. A vehicle communication interface 230 is in communication with the diagnostic tool 100 through connector interface 111 via an external cable 300.

Selectable signal translator 210 communicates with the vehicle communication interface 230 through the connector interface 111. Signal translator 210 conditions signals received from an ECU unit through the vehicle communication interface 230 to a conditioned signal compatible with diagnostic tool 100. Signal translator 210 can communicate with, for example, the following communication protocols: J1850 (VPM and PWM), ISO 9141-2 signal, communication collision detection (CCD) (e.g., Chrysler collision detection), data communication links (DCL), serial communication interface (SCI), Controller Area Network (CAN), Keyword 2000 (ISO 14230-4), OBD II or other communication protocols that are implemented in a vehicle.

The circuitry to translate and send in a particular communication protocol can be selected by FPGA 214 (e.g., by tri-stating unused transceivers). Signal translator 210 is also coupled to FPGA 214 and the card reader 220 via the first system bus 224. FPGA 214 transmits to and receives signals (i.e., messages) from the ECU unit through signal translator 210.

The FPGA 214 is coupled to the processor 202 through various address, data and control lines by the second system bus 222. FPGA 214 is also coupled to the card reader 220 through the first system bus 224. The processor 202 is also coupled to the display 102 in order to output the desired information to the user. The processor 202 communicates with the CPLD 204 through the second system bus 222. Additionally, the processor 202 is programmed to receive input from the user through the user interface 104 via the CPLD 204. The CPLD 204 provides logic for decoding various inputs from the user of the diagnostic tool 100 and also provides glue-logic for various other interfacing tasks.

Memory subsystem 208 and internal non-volatile memory 218 are coupled to the second system bus 222, which allows for communication with the processor 202 and FPGA 214. Memory subsystem 208 can include an application dependent amount of dynamic random access memory (DRAM), a hard drive, and/or read only memory (ROM). Software to run the diagnostic tool 100 can be stored in the memory 208 or 218, including any database. The database can include diagnostic information and other information related to vehicles. In one embodiment, the database can include additional information such as possible fixes for a particular DTC retrieved from a vehicle.

Internal non-volatile memory 218 can be an electrically erasable programmable read-only memory (EEPROM), flash ROM, or other similar memory. Internal non-volatile memory 218 can provide, for example, storage for boot code, self-diagnostics, various drivers and space for FPGA images, if desired. If less than all of the modules are implemented in FPGA 214, memory 218 can contain downloadable images so that FPGA 214 can be reconfigured for a different group of communication protocols.

The GPS antenna 232 and GPS receiver 234 may be mounted in or on the housing 101 or any combination thereof. The GPS antenna 232 electronically couples to the GPS receiver 234 and allows the GPS receiver to communicate (detects and decodes signals) with various satellites that orbit the Earth. In one embodiment, the GPS antenna and GPS receiver are one device instead of two. The GPS receiver 234 and GPS antenna 232 electronically couple to the processor 202, which is coupled to memory 208, NVM 218 or a memory card in the card reader 220. The memory can be used to store cartographic data, such as electronic maps. The diagnostic tool can include all the maps for the U.S. (or country of use), North America or can have the region or state where the diagnostic tool is located. In alternative embodiments, the diagnostic tool can have all the maps of the world or any portion of the world desired by the user. This allows the diagnostic tool to be a GPS device so that a driver can drive from one location to another. The maps may be over lay or incorporated with traffic, local events, and location of other GPS devices (smart phones) and other information that can be useful to the technician. By being able to locate other diagnostic tools with GPS, then the technicians may be able to use the diagnostic tools to locate each other in order to conduct a meeting or have a social event.

The GPS receiver communicates with and "locks on" to a certain number of satellites in order to have a "fix" on its global location. Once the location is fixed, the GPS receiver, with the help of the processor, can determine the exact location including longitude, latitude, altitude, velocity of movement and other navigational data of the diagnostic tool 100.

Should GPS receiver be unable to lock onto the minimum number of satellites to determine the altitude or unable to determine the altitude for any reason, the altimeter 236 can be used to determine the altitude of the diagnostic tool 100. The altimeter 236 is electronically coupled to the processor 202 and can provide the altitude or elevation of the diagnostic tool 100. The altimeter can be coupled to a barometric pressure sensor (not shown) in order to calibrate the elevation measurements determined by the altimeter. The sensor can be positioned interior or exterior to the housing 101 of the diagnostic tool 100. Minor atmospheric pressure changes can affect the accuracy of the altimeter, thus, diagnostic tool can correct for these changes by using the sensor in conjunction with the altimeter along with a correction factor known in the art.

Wireless communication circuit 238 communicates with the processor 202 via the second bus system 222. The wireless communication circuit 238 can be configured to communicate via RF (radio frequency), satellites, cellular phones (analog or digital), Bluetooth®, Wi-Fi, Infrared, Zigby, Local Area Networks (LAN), WLAN (Wireless Local Area Network), other wireless communication configurations and standards or a combination thereof. The wireless communication circuit 238 allows the diagnostic tool to communicate with other devices wirelessly. The wireless communication circuit includes an antenna built therein and being housed within the housing or can be externally located on the housing.

The adaptive cable described herein can replace the multiple cables and SSI that are used with the cable connecting the diagnostic tool 100 with the DLC. The adaptive cable, as explained herein, is configured to automatically configure switches and relays via a CPLD to provide the correct connections with the DLC. The adaptive cable can receive an expansion module (discussed below) for future upgrades and additionally functionality. Initially, the expansion module can be configured as being straight-through connection, but can be reconfigured or expanded, as needed. The insert can have printed circuit board (PCB) edge-finger that mates with a PCB within the adaptive cable.

Figure 3:
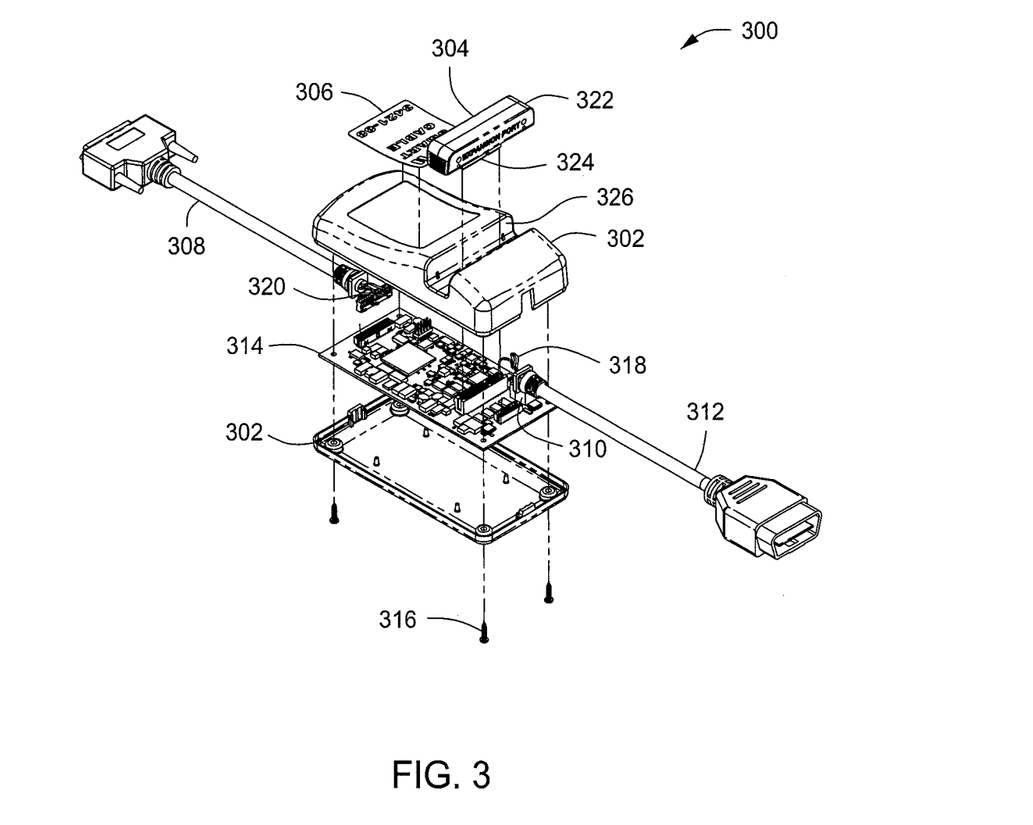
FIG. 3 illustrates an exploded view of an adaptive cable according to an embodiment of the invention.

FIG. 3 illustrates an exploded view of an adaptive cable 300 according to an embodiment of the invention. The adaptive cable includes a housing 302, the expansion module 304, a label 306, a DB25 (male to male) connector 308, a switchable relay 310 (discussed in FIG. 5), a J1962 connector (female) 312, a main PCB 314, and screws 316.

The housing can include a top and bottom portion for easy access to the main PCB, the ends of the J1962 and DB25 connectors and other components. The top and bottom portions of the housing may be coupled together by screws 316 or any other fastening means. The housing can be made from any natural or synthetic materials (ABS). The bottom of the housing includes off-sets on a surface to off-set the main PCB 314 from the bottom surface of the housing.

The housing can receive the expansion module 304 in a recess portion 326 of the housing so that the expansion module fits flush with the housing and connects with the main PCB. The expansion module 304 includes protrusions on the sides so that a user's fingers can better grip the sides of the module. The module has an upper portion 322 and a lower portion 324. The lower portion 324 includes PCB edge-finger to connect with the main PCB 314 and generally has smaller dimensions than the upper portion's dimensions.

The label 306 can be coupled to the housing through glue, tape or others similar means. The label can carry the logo of the company that is offering the adaptive cable 300 or any other information, such as model and serial numbers. The label can be stuck onto a sloping portion of the housing 302.

The DB25 connector 308 includes two ends. One end is designed to mate with the diagnostic tool at its connector interface 111. The second end mates with the housing and the main PCB through a connector 320. The commands from the diagnostic tool can be sent via the DB25 connector to a CPLD 422 (FIG. 4) of the adaptive cable in order to perform the multiplexing through switching of the array of internal FETs (Field Effect Transistors) and relays. The FETs and relays are normally in the off or non-connected condition. The FET can also be the MOSFET type.

The J1962 connector 312 allows the adaptive cable and the diagnostic tool to communicate with the DLC of the vehicle under test. The J 1962 connector 312 has a first and second ends. The first end can be connected to the DLC and the second end can be connected to the housing and the main PCB through a connector 318. Power to run the diagnostic tool and the adaptive cable may be drawn from the vehicle's battery through the J1962 connector (Vbat line). In some embodiments, the adaptive cable 300 and the diagnostic tool 100 may be powered by a set of batteries in the diagnostic tool or through other external sources. In other embodiments, the adaptive cable 300 has an internal battery source. Upon powering up, the connections that are active through the J1962 connector are the Vbat line and the ground. The remaining lines are in a high-impedance state until configured by the diagnostic tool.

Figure 4:
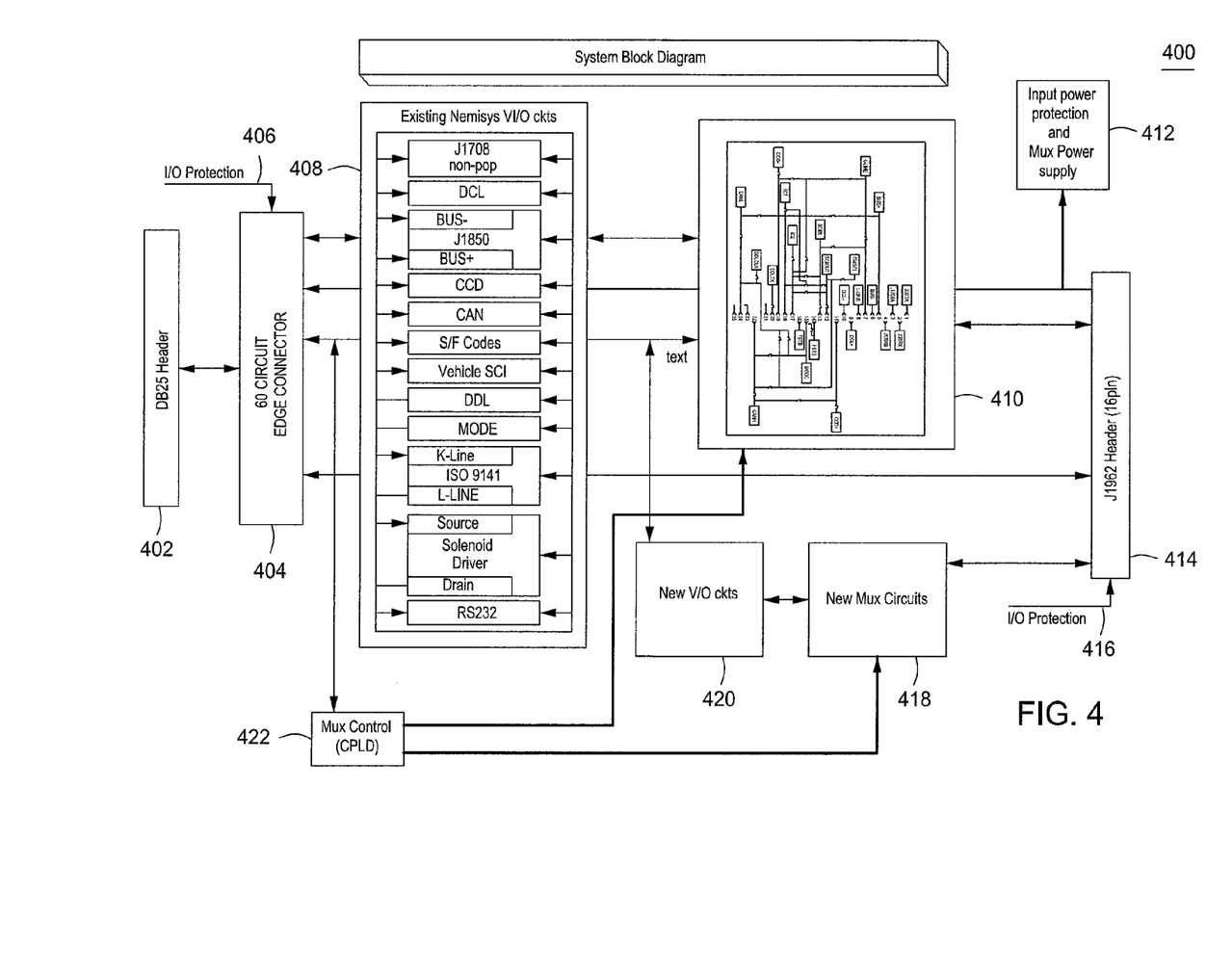
FIG. 4 is a block diagram of components of the adaptive cable of FIG. 3 according to an embodiment of the invention.

FIG. 4 is a block diagram 400 of components of the adaptive cable 300 according to an embodiment of the invention. The block diagram 400 includes a DB25 I/O header 402 to connect the adaptive cable to the diagnostic tool. The block diagram also illustrates the expansion card 404 (or 304), which is constructed and designed to expand the functionality of the adaptive cable and include a 64-pin edge-finger style connector that mates with the main PCB. The expansion card can include additional FETs, relays, memory, power, processors including FPGA (field programmable gate array), programming access to a CPLD (complex programmable logic device), communication protocol transmitters and receivers, wireless communication, GPS, and other components that can be used to expand the functionality of the adaptive cable and to allow the adaptive cable to communicate in additional communication protocols.

The CPLD 422 provides the communication interface with the diagnostic tool and the control interface for the FETs and relays of a multiplexer 410 to multiplex signals and other various ancillary functions. The communication interface can use the FORD DCL communication lines on the DB25 connector. These communications are bi-directional in nature. The control interface on the CPLD will have individual I/O lines to control individual FET switches.

Communication protocol module 408 contains the communication receivers and transceivers necessary for communicating with the vehicle under the test. The communication protocols can include Controlled Area Network (CAN), J1850 VPM and PWM, ISO 9141, DCL (communication links), S/F codes, a solenoid drive, J1708, 2201, CCD (communication collision detection (e.g., Chrysler collision detection)), Controller Area Network (CAN), SCI (serial communication interface), Keyword 2000 and other communication protocols. The communication protocol module also includes the RS232 serial interface for the diagnostic tool.

The multiplexer 410 includes all the components for it to perform the multiplexing function when instructed by the diagnostic tool. There are 25 pins that can be used with this embodiment of the multiplexer. As noted above, different vehicle manufacturers use different connections (pins) on the J1962 connector and different communication protocols. The multiplexer 410 must be able to make the right connections so that the diagnostic tool can communicate with the ECU based on the communication protocols used and the connections made at the DLC. The connections can be made with the FETs, relays and other components located in the multiplexer 410. For example, for CAN high and low, switches 21 and 10, respectively are switched into place should CAN protocol is being communicated. Using a multiplexing device, the SSI or keys are no longer required to be kept by the garage and allows the adaptive cable to deal with the various communication protocols from various vehicles. Although 25 pins are shown on FIG. 4, additional pins or fewer pins can be configured as needed.

Software in the diagnostic tool has been configured to know which connections on the J1962 connector on the vehicle are being used for which purposes and the software instructs the adaptive cable to configure itself to make the correct connections so that the diagnostic tool can communicate properly with the vehicle.

A power controller 412 controls the power supplied to adaptive cable. As noted above, the adaptive cable can be powered through the J1962 (Vbat) connection. The power controller can also regulate the power that is provided to the communication protocol module 408 so that the appropriate power is supplied to the communication protocol circuits (transmitter and receiver). Different communication protocol circuits require different power and thus, the power from the Vbat must be regulated to ensure the right power is provided depending on the communication protocol being used.

The J1962 connector 414 connects the adaptive cable to the DLC. A second multiplexer circuit 418 is also provided to cover additional communication protocols that will be needed in the future or were not able to fit in the multiplexer 410. The second multiplexer 418 includes the FETs, relays and other components to perform the required multiplexing task. New vehicle I/O circuits 420 provide additional circuits not already built into the multiplexer 410. Where protection is needed, appropriate I/O protection circuits 406, 416 are provided. The main PCB is designed to support the expansion card, the communication protocol module, the multiplexers, the V I/O, and I/O protection circuits thereon. However, the main PCB can have more or less components, thereon as needed.

Figure 5:
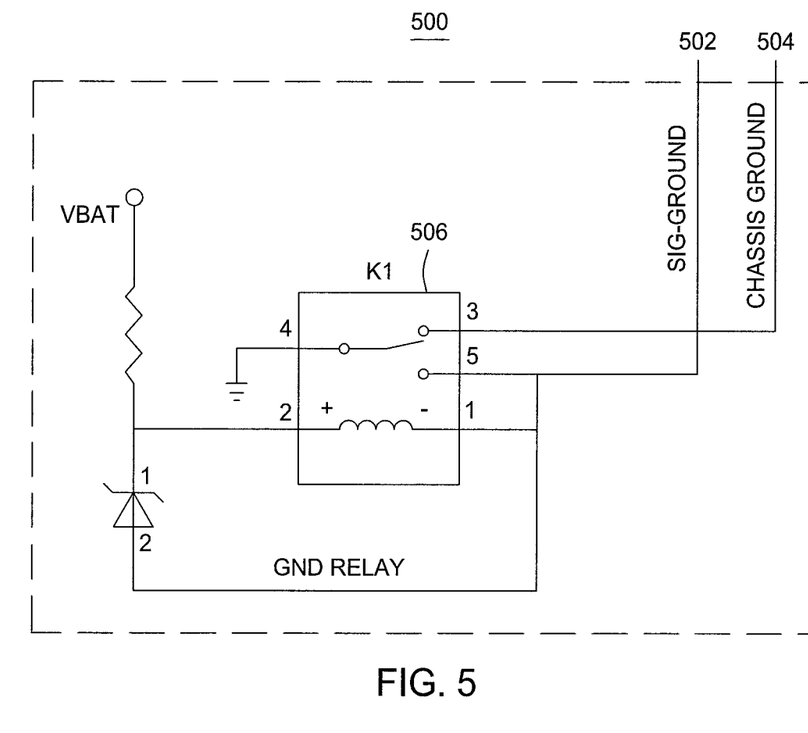
FIG. 5 is a schematic diagram of a relay circuit according to an embodiment of the invention.

FIG. 5 is a schematic diagram 500 of a relay circuit according to an embodiment of the invention. As stated above, vehicles can have two grounds, the signal ground 502 and chassis ground 504. These grounds provide the reference signal that the diagnostic tool needs to correctly decipher the signals it collects from the vehicles. Otherwise, the signals from the vehicle may float and accurate measurements are hard to make by the diagnostic tool. However, not all vehicles provide both grounds through the J1962 connector. The vehicle under test may provide one or the other ground and not both grounds. The diagnostic tool will usually look for the signal from the signal ground to see if it is present. However, when the signal ground is not present, the diagnostic tool may not look for a signal from the chassis ground until it is instructed to do so by the user.

The adaptive cable is provided with a relay 506 that can be energized to switch from one ground to another. The relay can be positioned between the signal ground 502 and chassis ground 504 connections. The relay can be configured to switch to the ground that is active in the J1962 connector. For example, the relay can be energized to automatically switch from the signal ground to the chassis ground when no signal is detected from the signal ground but a signal is present on the chassis ground. Thus, the diagnostic tool can always have a ground signal as a reference signal regardless of the vehicle under test.

In operation, the user can enter information about the vehicle under test into the diagnostic tool or the diagnostic tool can automatically detect the information. The information can include YIN, make, year, model and other vehicle information. Based on the information, the diagnostic tool can send a signal to the adaptive cable to configure the multiplexer to make the correct connections with the connections on the DLC. The diagnostic tool includes data for every year, make, and model so that the diagnostic tool can configure the adaptive cable for the correct connections. This can be done automatically without the user having to find the correct SSI cards or keys and insert them into the cable. By having an adaptive cable, the technician can quickly diagnose the vehicle instead of determining the correct SSI cards or keys for the vehicle and then wander around the garage to find them.

Figure 6:
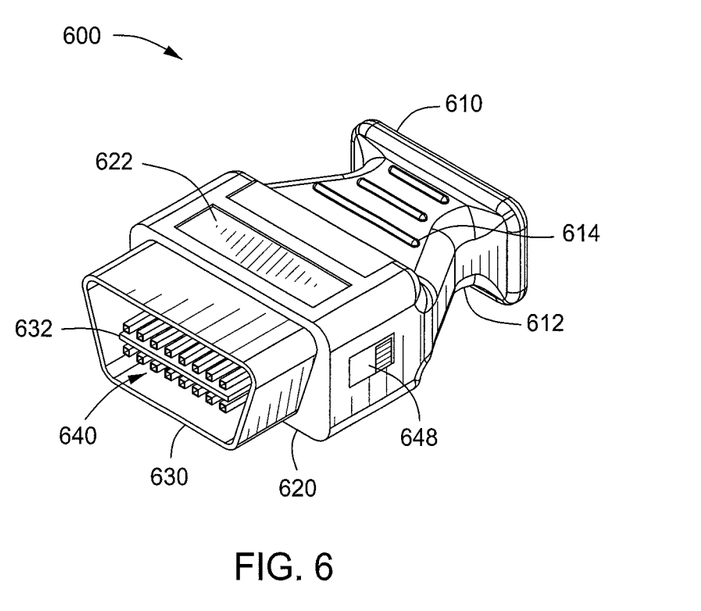
FIG. 6 illustrates a jumper connector according to an embodiment of the invention.

FIG. 6 illustrates a jumper connector 600 according to an embodiment of the invention. The jumper connector 600 includes three main parts, a handle 610, a body 620 and an interface 630. Either the handle 610 or the body 620 may include a single control input 648 described herein. The handle 610 includes an indent portion 612 that is configured and constructed to receive fingers of the technician for connecting or releasing of the jumper connector 600 from the DLC. An end of the handle 610 is generally rectangular in shape, but any shape can be used for the handle 610. The handle 610 includes raised portions 614 on upper and lower surfaces also configured and constructed to receive fingers thereon for connecting and releasing the jumper connector 600 from the DLC. The raised portions and the indent portions allow for easier connection and release of the jumper connector 600. In various embodiments, the handle 610 may be made of any materials including elastomeric materials. Further, portions of the handle 610 may be made of a soft elastomeric material and other portions may be made with a harder elastomeric material.

In another embodiment, the handle 610 may be colored or otherwise designated by other conventions (numbered, handle shape, etc.) so that the technician will know what pins are being jumped by a particular jumper connector 600. A chart may be created for use with the convention so that the technician can know exactly the connections being jumped by the jumper connector 600. This way, the technician can easily scan a drawer (where the jumper connectors may be stored) full of jumper connectors 600 and quickly pick the desired jumper connector 600. In other embodiments, the convention desired can be applied to other portions of the jumper connector 600 or to only that part, such as the body 620 or the interface 630.

In one embodiment, the body 620 is generally larger than the handle 610 and can contain a portion of or all of the jumper portion (see FIG. 8) of the jumper connector 600. The body 620 can include a recessed area 622 on a side of the body 620. The recessed area 622 can be used for a variety of functions including for affixing a logo or name associated with the jumper connector 600 or identify the pins being jumped. The recessed area 622 can be used for one of the conventions discussed herein, such as numbers thereon.

The interface 630 is constructed and designed to fit a complementary interface to which it will be connected. In this embodiment, the interface 630 is designed to connect to the DLC (not shown) of a vehicle. The interface 630 includes a tab portion 632 to assist the interface 630 to frictionally fit with the DLC and an array of pins 640, each pin may be plugged into a respective pin receptacle of the DLC. Although 126 pins are shown, the number of pins may be more or less depending on the vehicle being jumped.

Figure 7:
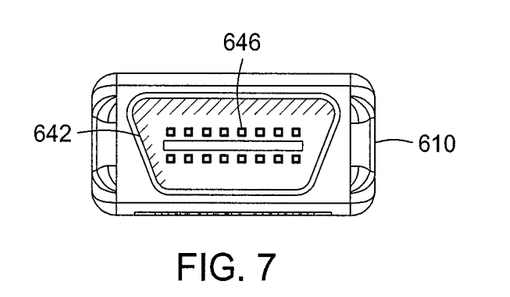
FIG. 7 illustrates the jumper connector showing a connection for connecting the jumper connector in series with the adaptive cable according to an embodiment of the invention.

FIG. 7 illustrates that the jumper connector 600 described herein may be connectable to the adaptive cable 300 also described herein. The jumper connector 600 may include a receiving interface 642 in its handle 610. The receiving interface 642 may be of a size, shape, and configuration (16 pins, 25 pins, etc.) to accommodate any connector of the adaptive cable 300. In one embodiment, the receiving interface 642 is of the type able to connect to the J1962 connector 312 of the adaptive cable 300 described herein, where pins (male) of the J1962 connector 312 may plug into respective pin (female) receptacles 646 of the receiving interface 642.

Figure 8:
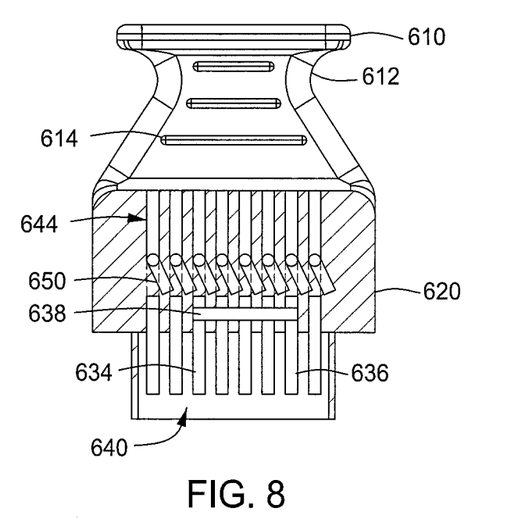
FIG. 8 illustrates a partial cut away of the jumper connector showing the wire and pins according to an embodiment of the invention.

In one embodiment, illustrated in FIG. 8, each of the pins 640 are connected to a respective one of the pin receptacles 646 (see FIG. 7) via a switch 644 having contacts 650. The switches 644 may be controlled via the single control input 648 (see FIG. 6), such as a button, knob, wheel, or dip switch, the control input 648 may be integral to the handle 610 or the body 620. The switches 644 may have different states, such as open and closed depending on the position of the contacts 650. The natural or resting state of the switches 644 may be either open or closed. The manipulation of the control input 648 changes the state of the switches 644 from open to closed (by moving the contacts 650), or from closed to open (by moving the contacts 650) depending on their states.

A jumper connection may be created in the form of pins 634 and 636 which may be electrically connected together via a wire 638. The pins 634 and 636, and the wire 638 may all be parts of one piece, or each may be a separate piece. Because the pins 634, 636 are electrically connected together, when they are mated to the DLC and their respective pin receptacles, the connection will be jumped. That is, a desired functionality of the vehicle may be activated because certain pins 634, 636 are jumped. Some examples of the functionality that can be activated can include jumping pins 4 & 8 to clear or check DTC (diagnostic trouble code) and pins 4 & 12 to activate test mode procedure for vehicle stability control system.

In the embodiment where the pins 634 and 636, and the wire 638 may all be parts of one piece, the wire 638 has a higher resistive property than the switches 644, such that when the switches are closed, the jump with pins 634 and 636 is bypassed, and the pins 634 and 636 are functionally connected to their respective pin receptacles 646. Where the pins 634 and 636, and wire 638 are separate pieces, the wire 638 and the switches 644 (including contacts 650) are all controlled by the same control input 648. When the switches 644 are in a closed state, then wire 648 is disengaged from any connection to pins 640, or it is at least connected to no more than one of the pins 640, such as one of the ground pins, thus none of the pins are jumped. If the switches 644 are in the open position, then the wire 638 is connected to pins 634 and 636, jumping these pins to put the vehicle in a desired state. In one embodiment, the control input 648 may be manually manipulated by a user to open the switches 644 and engage the connection of the wire 648 with pins 634 and 636, or to close the switches 644 and disengage the connection of the wire 648 from pins 634 and 636. This may be done using reciprocal movement of the contacts 650 (to make contact or not make contact) and the wire 648 via known methods.

The state of the switches 644 and whether or not the wire 638 contacts the designated pins (634, 636) may be controlled by the control input 648 as discussed herein. Manipulation of the control input 648 may affect the position of the switches 644 and the wire 638 in numerous ways. In one embodiment, the control input 648 may be physically connected to contacts 650 of the switches 644 and the wire 638, where movement of the control input 648 is translated by the physical connection to the switches 644 and the wire 638 as described above, as an example. In another embodiment, the manipulation of the control input 648 may cause magnetic fields to be applied to the contacts 650 of switches 644 and the wire 638 causing them to either engage or disengage their respective pins 640. The magnetic field may be caused by magnetically charged components that are moved in and out of proximity with contacts 650 of the switches 644 and the wire 638 depending on the state of the control input 648. Another embodiment may include creating the magnetic field by applying a current to contacts 650 of the switches 644, the wire 638, or the pins 640, causing the contacts 650 of switches 644 and the wire 638 to either engage or disengage their respective pins 640.

The switches 644, in one embodiment, may operate in a manner where the contacts 650 of the switch 644 pivots or bends to cause the switch 644 to engage or disengage its respective pin 640. The wire 638 may operate similarly to the switches 644, where the wire 638 may be attached to one of the pins 640, and the wire 638 may pivot or bend causing the wire 638 to engage or disengage its other respective pin 640. In another embodiment, the wire 638 may engage and disengage all of the pins 640 to which the wire 638 connects to create the jump connection. In this embodiment, the manipulation of the control input 648 may cause the wire 638 to move in a direction, such as laterally across the pins 644, causing connecting surfaces of the pins 640 and the wire 648 to be in or out of phase. Another movement that may cause similar phase alignments is rotation of the wire 638 along a plane that is substantially parallel with the pins 644. Another embodiment may allow the wire 638 to move in and out of contact with the pins 644 in a direction along a plane that might intersect the pins 644. The embodiments of the invention include the ability to jump the various pins as desired even if the pins are on different planes or levels.

In this embodiment, pins 634 and 636, conventionally designated 11 and 15. are jumped by the wire 638. One of ordinary skill in the art would recognize that the combination of pins 634 and 636 designated 11 and 15 is only exemplary, and that any other of the pins 640 may be connected via the wire 638 to form a jumped connection. Some examples of the functionality that can be activated can include jumping pins 4 and 8 to clear or check DTC (diagnostic trouble code) and pins 4 and 12 to activate test mode procedure for vehicle stability control system. Once the jumper connector 600 is connected to the DLC, then the desired testing can take place.

Figure 9:
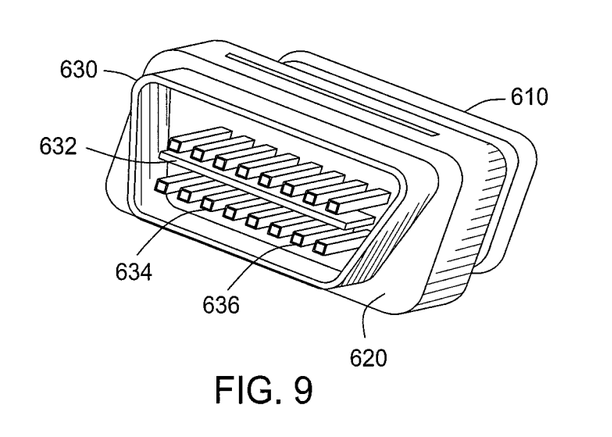
FIG. 9 illustrates a plan view of the jumper connector according to an embodiment of the invention.

FIG. 9 illustrates a plan view of the jumper connector 600 according to an embodiment of the invention. In this view, the pins 634 and 636 are shown which corresponds to pins 11 and 15 on the DLC. With the pins 634 and 636 connected by wire 638, the technician can use jumper connector 600 to jump pins 11 and 15 to have the desired functionality.

In operation, the technician can determine which functionality in the vehicle he wants to test. Then he can determine which pins 634, 636 correspond to the pins that need to be jumped in the DLC in order for that functionality to activate. He then can select the proper jumper connector 600 designated by a convention such as a colored handle 610. Once the correct jumper connector 600 is selected it can be connected with the DLC and the desired pins on the DLC are jumped when the switches 644 are open, and wire 638 (see FIG. 8) engages pins 634 and 636. With the pins on the DLC jumped, then the functionality is activated and the vehicle can be tested for the operation of that functionality.

Figure 10:
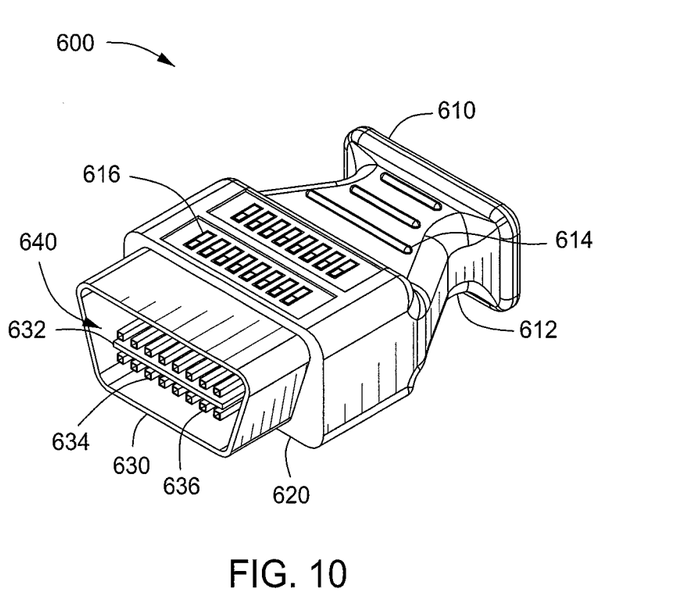
FIG. 10 illustrates an alternative embodiment using switches according to an embodiment of the invention.

FIG. 10 illustrates an alternative embodiment using switches 616 according to an embodiment of the invention. In this embodiment, handle 612 or body 620 can include dip switches 616 so that the pins 640 may be varied according to the needs of the technician. There can be a dip switch 616 on the handle 612 or body 620 for each of the pins 640. There can be as little or as many switches 616 as needed. The dip switches 616 can start at a bottom portion (inactive) of the handle 612 or body 620 and moved to a top portion (active) of the handle 612 or body 620. In one embodiment, the bottom portion may be towards the handle 612 and the top portion may be towards the interface 630. In another embodiment, the top portion may be towards the handle 612 and the bottom portion may be towards the interface 630.

When the dip switch 616 is in the bottom portion or the inactive state, the corresponding pins 640 in the interface 630 is not active or connected to its respective pin receptacle 646. When the dip switch 616 is moved to the top portion or the active state, the corresponding pin 640 is in position to be connected to its respective pin receptacle 646. Thus, in order to connect two pins in the DLC, the corresponding dip switch 616 can be moved into the top portion of the handle 610 or body 620 while the remaining dip switches 616 remain in the bottom portion of the handle 610 or body 620. For example, if the technician wants to jump connections 11 and 15 in the DLC, then he can move the corresponding dip switches 616 to make the jump.

To make the jump, the diagnostic tool 100 may be used to set the multiplexer 410 (see FIG. 4) of the adaptive cable 300 (see FIG. 3) to a generic jump mode. In the jump mode, the multiplexer 410 may be able to functionally connect the pins 634 and 636 to each other to create the jump connection. It may not be necessary to enter into the diagnostic tool 100 (see FIG. 1) which of the pins 640 are being jumped. In generic jump mode, the adaptive cable 300 may be able sense that the dip switches 616 for pins 634 and 636 have been set to the active position by detecting the signals on those pins, and the CPLD 422 (see FIG. 4) may set the multiplexer 410 to the appropriate setting to jump the designated pins 634 and 636 selected via the dip switches 616.

In an alternative embodiment, the jumper connector 600 can have a preventive mechanism that only allows for two dip switches 616 to move into the upper portion of the handle 610 or body 620 or the active state. With this preventive mechanism, only two pins 640 can be jumped instead of three or more. This will prevent damage to the vehicle that can be caused by having more than two pins 640 being jumped.

In this embodiment with the dip switches 616, the jumper connector 600 can be made to be more universal so that less jumper connectors 600 will be needed per garage or per garage bay. In operation, as above, the technician can determine which functionality in the vehicle he wants to test. Then he can determine which pins are needed to be jumped in the DLC in order for that functionality to activate. He then can select the proper dip switches 616 to move into position in order to be active. Once the correct dip switches 616 are moved into the active position, the jumper connector 600 can be connected with the DLC and the desired pins on the DLC are jumped. With the pins on the DLC jumped, the jump connector may be disconnected, and the multiplexer may reconfigure it's connections to accommodate the proper communication protocol for the vehicle so that the functionality then activated can be tested.

Figure 11:
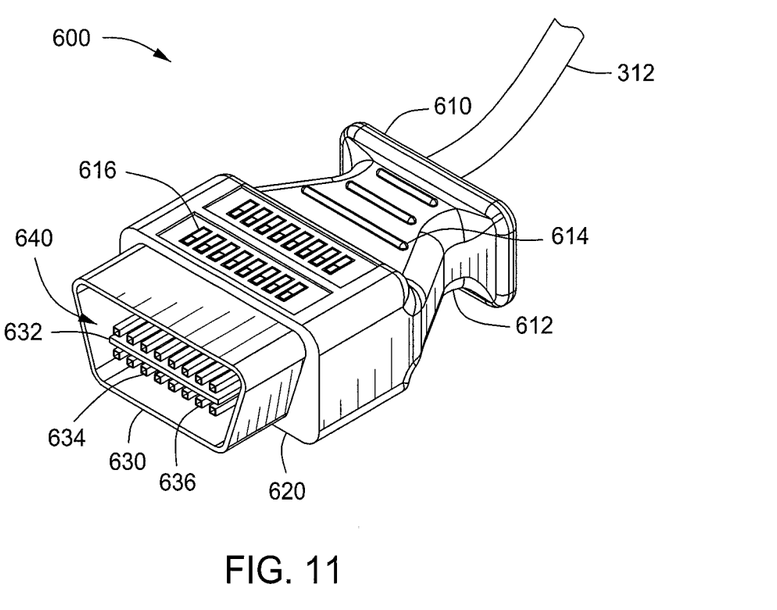
FIG. 11 illustrates a jumper connector integrated as part of the adaptive cable of FIG. 3 according to an embodiment of the invention.

FIG. 11 illustrates an embodiment of the jumper connector 600 integrated into the J1962 connector 312. In this embodiment, instead of having the pins 640 connected to the pin receptacles 646 (see FIG. 7), and plugging the pins of the J1962 connector 312 into the pin receptacles 646 to connect the adaptive cable 300 (see FIG. 3) to the jumper connecter 600, the pins 640 are connected to the connector 318 (see FIG. 3). In this embodiment, all of the parts of the jumper connector either coincide with similar parts of the J1962 connector 312, or are integrated into the J1962 connector 312 as a single unit. Therefore, the J1962 connector 312 may further include the dip switches 616 and the switches 644. The switches 644 may connect the pins 640 to the connector 31.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An adaptive cable for use with a vehicle diagnostic tool, comprising:
   a complex programmable logic device adapted to receive instructions from the vehicle diagnostic tool;
   a multiplexer adapted to receive instructions from the complex programmable logic device to configure multiplexer connections for a vehicle communication protocol and for a jump connection of cable pins;
   a first cable to connect the adaptive cable to the vehicle diagnostic tool at a first end and to communicate with the complex programmable logic device at a second end;
   a second cable to connect to a data link connector in a vehicle at a first end, the first end having the cable pins for the jump connection, and to communicate with the multiplexer at a second end;
   a housing that houses the multiplexer, a portion of the first cable, a portion of the second cable, and the complex programmable logic device; and
   a plurality of switches on a surface of the first end of the second cable, each of the plurality of switches paired to the corresponding cable pin.

2. The adaptive cable of claim 1, wherein the cable pins are configured to contact with complementary connector pins on the data link connector, and wherein when the multiplexer creates the jump connection on the cable pins, a desired function in the vehicle is activated.

3. The adaptive cable of claim 2, wherein the multiplexer allows for only two connector pins on the data link connector to be jumped at a time.

4. The adaptive cable of claim 2, wherein the connector pins being jumped on the data link connector correspond to the switches set on the adaptive cable.

5. The adaptive cable of claim 1, wherein the complex programmable logic device senses which switches of the plurality of switches are set so that the appropriate connection of the cable pins is made by the multiplexer.

6. The adaptive cable of claim 1 further comprising a communication protocol module that communicates in various communication protocols and communicates with the multiplexer.

7. The adaptive cable of claim 1, wherein the plurality of switches are activated when moved in a first direction and are inactivated when moved in a second direction.

8. An adaptive cable for use with a vehicle diagnostic tool, comprising:
   means for controlling that receives instructions from the vehicle diagnostic tool;
   means for multiplexing that receives instructions from the means for controlling to configure the means for multiplexing connections for a vehicle communication protocol and for a jump connection of cable pin
   first means for transmitting that connects the adaptive cable to the vehicle diagnostic tool at a first end and to communicate with the means for controlling at a second end;
   second means for transmitting that connects to a data link connector in a vehicle at a first end, the first end having the cable pins for the jump connection, and to communicate with the means for multiplexing at a second end;
   means for housing the means for multiplexing, a portion of the first means for transmitting, a portion of the second means for transmitting, and the means for controlling; and
   plurality of means for switching on a surface of the first end of the second means for transmitting, each of the plurality of means for switching paired to the corresponding cable pin.

9. The adaptive cable of claim 8, wherein the cable pins are configured to contact with complementary connector pins on the data link connector, and wherein when the means for multiplexing creates the jump connection on the cable pins, a desired function in the vehicle is activated.

10. The adaptive cable of claim 9, wherein the means for multiplexing allows for only two connector pins on the data link connector to be jumped at a time.

11. The adaptive cable of claim 9, wherein the connector pins being jumped on the data link connector correspond to the switches of the plurality of means for switching set on the adaptive cable.

12. The adaptive cable of claim 8, wherein the means for controlling senses which switches of the plurality of switches are set so that the appropriate connection of the cable pins is made by the means for multiplexing.

13. The adaptive cable of claim 8 further comprising a communication protocol module that communicates in various communication protocols and communicates with the means for multiplexing.

14. The adaptive cable of claim 8, wherein the plurality of means for switching are activated when moved in a first direction and are inactivated when moved in a second direction.

15. A method of placing a vehicle in a desired state diagnostic testing, comprising the steps of:
   receiving a communication protocol instruction from a diagnostic tool via a first cable of an adaptive device having a complex programmable logic device and a multiplexer;
   sending configuration instructions from the complex programmable logic device to the multiplexer, wherein the multiplexer configures its connections based on the communication protocol instructions;
   providing communication between the diagnostic tool and a data link connector with a communication protocol module, and the multiplexer via a second cable connected to the data link connector; and
   providing a connection between connector pins on the data link connector of the vehicle to place the vehicle in the desired state.

16. The method of claim 15, further comprising providing a connection between two cable pins of the second cable that connect to corresponding connector pins the data link connector.

17. The method of claim 15, further comprising utilizing the multiplexer to connect two cable pins of the second cable that connect to the corresponding connector pins on the data link connector.

18. The method of claim 15 further comprising the step of:
   selecting the connector pins on the data link connector to be shorted with a plurality of switches that are paired with cable pins on the second cable that connects to the corresponding connector pins on the data link connector.

19. The method claim of claim 15 further comprising the step of:
   receiving vehicle diagnostic data when the vehicle is in the desired state.

20. The method of claim 15, further comprising connecting only two connector pins at a time.

\* \* \* \* \*